(12) United States Patent
Zhong et al.

(10) Patent No.: US 10,416,915 B2
(45) Date of Patent: Sep. 17, 2019

(54) ASSISTING DATA DEDUPLICATION THROUGH IN-MEMORY COMPUTATION

(71) Applicant: ScaleFlux, San Jose, CA (US)

(72) Inventors: Hao Zhong, Los Gatos, CA (US); Fei Sun, Irvine, CA (US); Yang Liu, Milpitas, CA (US)

(73) Assignee: SCALEFLUX, San Jose, CA (US)

( * ) Notice: Subject to any disclaimer, the term of this patent is extended or adjusted under 35 U.S.C. 154(b) by 57 days.

(21) Appl. No.: 15/154,044

(22) Filed: May 13, 2016

(65) Prior Publication Data

US 2016/0335024 A1 Nov. 17, 2016

Related U.S. Application Data

(60) Provisional application No. 62/161,928, filed on May 15, 2015.

(51) Int. Cl.
*G06F 3/06* (2006.01)

(52) U.S. Cl.
CPC .......... *G06F 3/0641* (2013.01); *G06F 3/061* (2013.01); *G06F 3/0605* (2013.01); *G06F 3/0608* (2013.01); *G06F 3/0658* (2013.01); *G06F 3/0679* (2013.01)

(58) Field of Classification Search
CPC .......... G06F 3/0641; G06F 17/30156–30162; H03M 7/3091–3095
See application file for complete search history.

(56) References Cited

U.S. PATENT DOCUMENTS

| | | | | |
|---|---|---|---|---|
| 9,514,146 B1 * | 12/2016 | Wallace | ............ | G06F 17/30501 |
| 2004/0174276 A1 * | 9/2004 | McCanne | ............... | H03M 7/30 |
| | | | | 341/50 |
| 2009/0204636 A1 * | 8/2009 | Li | ..................... | G06F 17/30097 |
| 2010/0125553 A1 * | 5/2010 | Huang | ................ | G06F 11/1453 |
| | | | | 707/661 |
| 2011/0055471 A1 * | 3/2011 | Thatcher | ............... | G06F 3/0608 |
| | | | | 711/114 |
| 2011/0218972 A1 * | 9/2011 | Tofano | ............. | G06F 17/30159 |
| | | | | 707/692 |
| 2011/0238635 A1 * | 9/2011 | Leppard | ............ | G06F 17/30159 |
| | | | | 707/693 |
| 2011/0307447 A1 * | 12/2011 | Sabaa | ................. | H04L 67/2842 |
| | | | | 707/637 |
| 2012/0084269 A1 * | 4/2012 | Vijayan | ............. | G06F 17/30156 |
| | | | | 707/692 |

* cited by examiner

*Primary Examiner* — Edward J Dudek, Jr.
*Assistant Examiner* — Andrew Russell
(74) *Attorney, Agent, or Firm* — Hoffman Warnick LLC

(57) ABSTRACT

A data storage system having a hashing engine for facilitating data deduplication. A device is provided that includes: a storage media; and a controller, wherein the controller includes a hashing engine for implementing a data deduplication process on data stored in the storage medium, wherein the hashing engine: inputs parameters from a host that specifies a sliding widow size and a boundary condition; implements a rolling hash function; and outputs a data chunk boundary.

3 Claims, 5 Drawing Sheets

ASSISTING DATA DEDUPLICATION THROUGH IN-MEMORY COMPUTATION

CROSS REFERENCE TO RELATED APPLICATION

This application claims priority to co-pending U.S. Provisional Patent Application Ser. No. 62/161,928 filed May 15, 2015, which is hereby incorporated herein as though fully set forth.

TECHNICAL FIELD

The present invention relates to the field of data storage and processing, and particularly to providing unified in-memory data storage and data deduplication services in computing systems.

BACKGROUND

Aiming to eliminate the data redundancy and hence reduce data storage footprint and/or data transfer volume, data deduplication has become an indispensable feature in almost all the storage archive/backup systems and many front-end computing/storage systems. The basic principle of data deduplication can be descried as follows. First, files are split into multiple chunks, where all the chunks may have the same or different size (typically at least a few kB and larger) dependent upon whether content awareness is incorporated into the chunking process. In general, content-aware chunking (hence variable chunk size) tends to achieve better data deduplication efficiency. Content-aware chunking is typically realized by using certain rolling hash schemes such as Rabin fingerprinting.

Given each data chunk, data deduplication aims to discover and accordingly exploit the redundancy between a current chunk and the other chunks that have been stored or transferred in the system. This is realized in either a locality-based or similarity-based manner, where the former only focuses on exactly identical chunks and the latter considers both identical and highly similar chunks.

In the context of locality-based data deduplication, for each individual chunk, a locality-oriented signature (or fingerprint) with a reasonably small size (e.g., 20 bytes or 32 bytes) is calculated using a hash function (e.g., SHA-1 or SHA-256). The signature is used to determine whether two chunks are identical (i.e., if the signatures of two same-sized chunks are identical, then the two chunks are considered to be identical).

In the context of similarity-based data deduplication, more complicated hashing schemes are used to calculate similarity-oriented signatures for each chunk.

The signatures are used to determine whether two chunks are identical or highly similar. Once multiple identical data chunks are identified, the system can physically store or transfer only a single copy through appropriate data structure management. For similarity-based data deduplication, once multiple highly similar data chunks are identified, the system can only physically store or transfer a single copy and the inter-chunk differences through appropriate data structure management.

The system maintains a signature index consisting of all or portion of all the data chunks that have been stored or transferred. One critical process is to, given the signature of a new data chunk, determine whether this signature already exists in a current signature index. Such a signature index look-up operation can be very time and resource consuming and hence degrade the overall data deduplication speed performance, especially for large-scale systems. In practical implementation, a Bloom filter is typically used to eliminate unnecessary signature index look-ups and hence speed up the data deduplication. The objective of a Bloom filter is to, without carrying out any index look-up, quickly identify those signatures that are definitely not in current signature index. This can obviate a significant amount of costly and unnecessary signature index look-up operations. The core operation of a Bloom filter is to apply several (e.g., k) hash functions onto the signature in order to obtain k integers, $h_1, \ldots, h_k$, whose values all fall into a given range $[0, m-1]$. If any one out of the k bits at position $h_1, \ldots, h_k$ in the m-bit summary vector is 0, then it is guaranteed that this signature is not in current signature index. For each signature being added to the signature index, the corresponding k bits in the summary vector should be set as 1.

SUMMARY

For computing systems in which host processing chips such as CPUs/GPUs implement data deduplication, systems and methods are provided that implement various hash functions and data processing throughout the data deduplication process on data storage devices. For example, flash memory based solid-state data storage devices may utilize in-storage hash function computations to gain various advantages such as reducing the host computational workload, reducing host main memory capacity, and reducing data traffic across the storage-memory-CPU hierarchy.

In a first aspect, the invention provides a data storage device, comprising: a storage media; and a controller, wherein the controller includes a hashing engine for implementing a data deduplication process on data stored in the storage medium, wherein the hashing engine: inputs parameters from a host that specifies a sliding widow size and a boundary condition; implements a rolling hash function; and outputs a data chunk boundary.

In a second aspect, the invention provides a data storage device, comprising: a storage media; and a controller, wherein the controller includes a hashing engine for implementing a data deduplication process on data stored in the storage medium, wherein the hashing engine: inputs a location and size of a data chunk from a host; implements a hash function on the data chunk that calculates a chunk signature; and outputs the chunk signature.

In a third aspect, the invention provides data storage device, comprising: a storage media; and a controller having a delta compression engine for processing data chunks in the storage media identified as similar, wherein the controller includes: a data read module that receives addresses of a pair of data chunks from a host, a first algorithm for calculating a difference between the data chunks, and a second algorithm for compressing the difference.

The features alluded to herein may also be implemented as a chip, a controller, e.g., a card that plugs into a memory system, a method and/or a program product for hashing or otherwise processing data in a data storage device to improve data deduplication efficiency.

BRIEF DESCRIPTION OF THE DRAWINGS

The numerous embodiments of the present invention may be better understood by those skilled in the art by reference to the accompanying figures in which.

DETAILED DESCRIPTION

Reference will now be made in detail to embodiments of the invention, examples of which are illustrated in the accompanying drawings.

The disclosed embodiments deal with computing systems in which host processing chips carry out data deduplication in order to reduce the data storage footprint and/or transfer volume in computing systems. Throughout the entire data deduplication process, various hashing functions are utilized to implement content-aware data chunking, locality-oriented or similarity-oriented signature computation, and Bloom filters.

Figure 1:
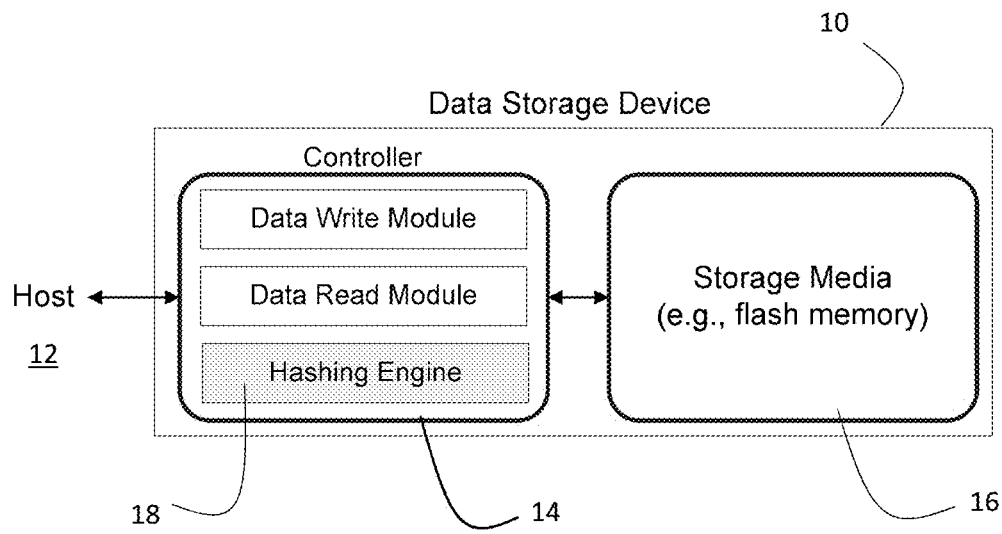
FIG. 1 illustrates the diagram of integrating a hashing engine in storage device controller according to embodiments.

As illustrated in FIG. 1, embodiments are provided to directly realize all or some of these hashing functions inside a data storage device 10, which stores data for a host 12 in a storage media 16, such as flash memory. In particular, a hashing engine 18 in the storage device controller 14 is provided to perform various hashing activities implemented during a data deduplication process based on a set of parameters provided by an external system such as host 12.

Figure 2:
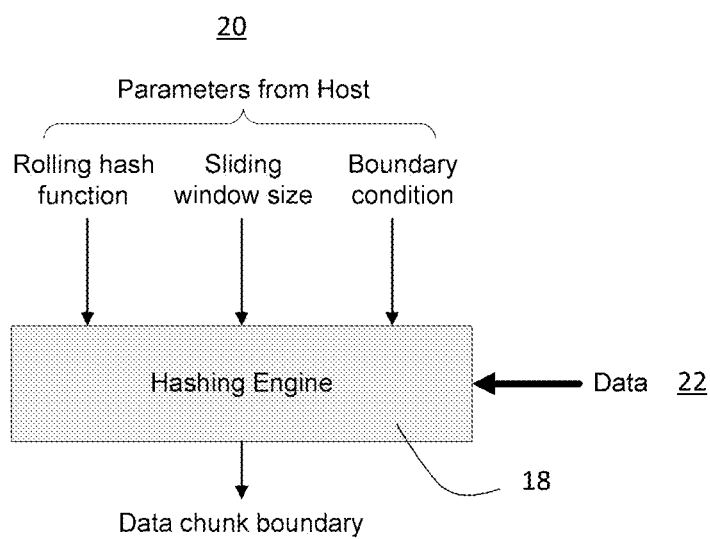
FIG. 2 illustrates the diagram for using the hashing engine to carry out data chunking calculation according to embodiments.

FIG. 2 depicts an illustration of hashing engine 18 implemented to perform content-aware data chunking inside data storage device 10. To realize content-aware data chunking, a rolling hash function (e.g., Rabin fingerprinting, Rabin-Karp string search, etc.) is applied to a sliding window across a bitstream of data 22 stored in the storage media 16. The hashing result is continuously updated with the sliding window and checked against a pre-defined boundary condition (e.g., h(W) modulo D=r, where h denotes the rolling hash function, W denotes the current data within the sliding window, D are r are constants).

As shown in FIG. 2, the host 12 may provide the following parameters 20 to the hashing engine 18:

1. The particular rolling hash function to be used for data chunking;
2. The length of the sliding window; and
3. The parameters being used in boundary condition check.

During runtime, the hashing engine 18 in the storage device 10 carries out the entire data chunking process and sends the chunking results (i.e., the locations of all the chunk boundaries) to the host 12. Note that the hashing engine 18 may be implemented with a set of rolling hash functions to allow the host 12 to select the most appropriate one. Alternatively, hashing engine may be implemented with a single or default rolling hash function, in which case it need not be specified within parameters 20.

After data chunking, the next operation is to calculate the chunk signatures for each individual data chunk. For locality-oriented data deduplication, typically only a single signature is required for each chunk. For similarity-oriented data deduplication, multiple signatures are required. Implementation of a data chunk signature calculation can be separate from or integrated with the data chunking process.

Figure 3:
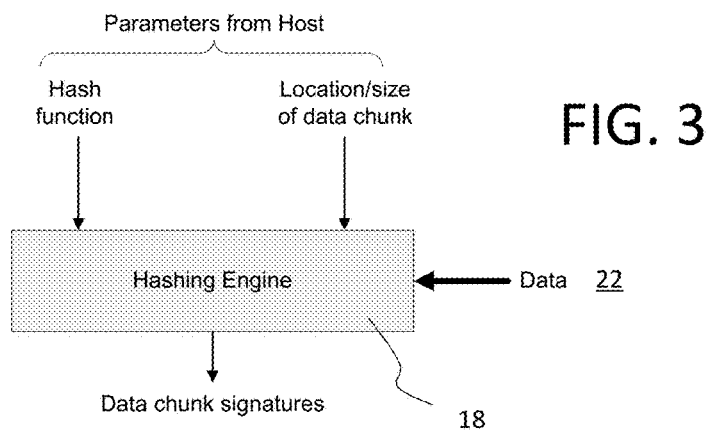
FIG. 3 illustrates the diagram for using the hashing engine to carry out data chunk signature calculation according to embodiments.

FIG. 3 shows the case when data chunk signature calculation is separate from the data chunking process. The host 10 provides the following parameters 26 to the hashing engine 18:

1. The particular hash functions to be used for calculating the data chunk signatures (if multiple options are included in the hash engine 18); and
2. The location and size of the data chunk to be processed.

During the runtime, the hashing engine 18 in the storage device 10 carries out the hashing operation to obtain the signatures 28 for each data chunk, and if required, sends the signatures 28 to the host 12.

Figure 4:
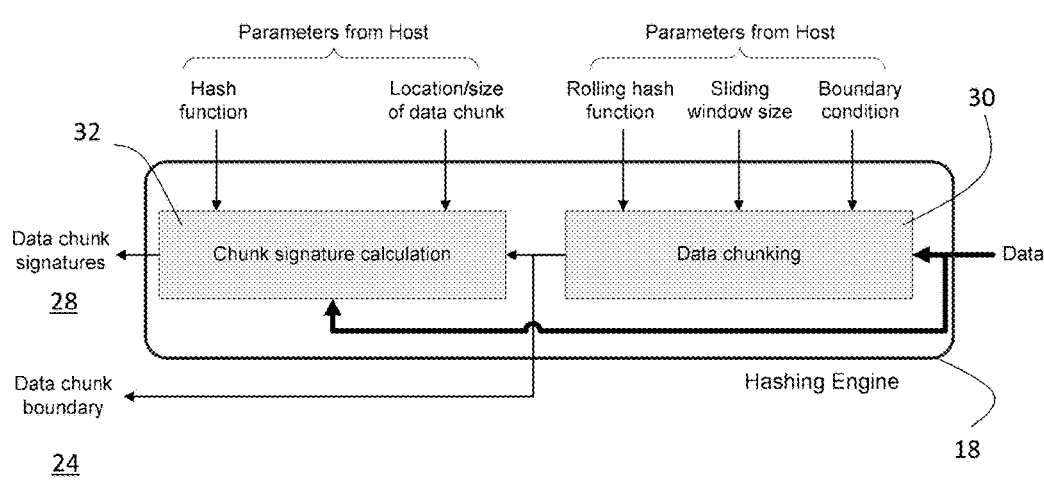
FIG. 4 illustrates the diagram of using the hashing engine to carry out data chunking and chunk signature calculation concurrently according to embodiments.

FIG. 4 shows an embodiment of hashing engine 18 in which the data chunk signature calculation 32 is integrated with the data chunking process 30. Starting from the very beginning of a new data chunk, the hashing engine 18 carries out the rolling hash for data chunking and hashing for data chunk signature calculation concurrently. As shown in FIG. 4, the data go through the two computational components 30, 32 in serial (e.g., bit-by-bit or byte-by-byte). Once the hashing engine 18 identifies the chunk boundary 24 (i.e., the end point of current data chunk), it accordingly finishes up the data chunk signature calculation 32, and sends both chunking results 24 and signature calculation 28 results to the host 12 (FIG. 1).

Figure 5:
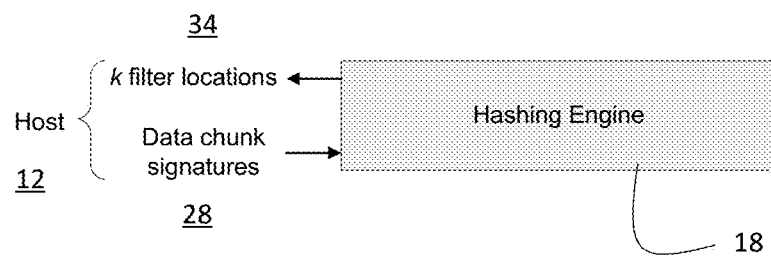
FIG. 5 illustrates the diagram of using the hashing engine to calculate the Bloom filter location parameters according to embodiments.

In a further embodiment, the output may be processed by an in-memory Bloom filter. Recall that the core operation of a Bloom filter is to apply several (e.g., k) hash functions onto the signature in order to obtain k integers, $h_1, \ldots, h_k$, whose values all fall into a given range [0, m-1]. As shown in FIG. 5, these k integers are referred to as filter locations 34. Given the data chunk signatures 28, the hashing engine 18 carries out the Bloom filter computation to obtain the k filter locations 34. If the hashing engine 18 is not aware of the current value of the summary vector, the hashing engine 18 sends the obtained k filter locations to the host 12.

Figure 6:
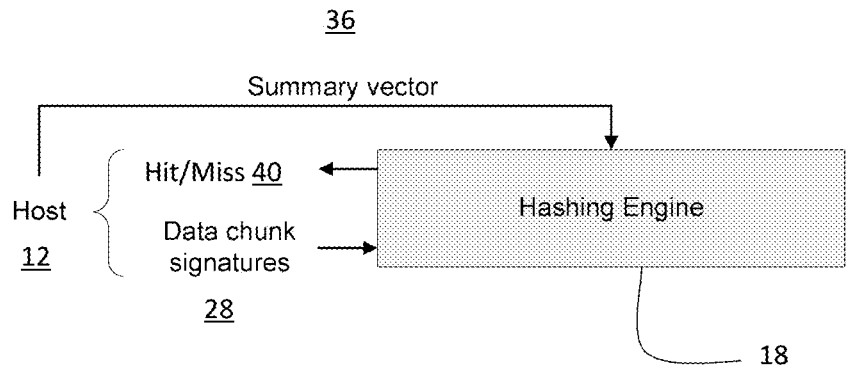
FIG. 6 illustrates the diagram of using the hashing engine to directly report a Bloom filter hit/miss result with summary vector according to embodiments.

As shown in FIG. 6, if the hashing engine 18 knows the current value of the summary vector 36 (e.g., the host 12 keeps updating the hashing engine 18 with the summary vector 36), the hashing engine 18 checks the summary vector 18 based upon the obtained k filter locations, and accordingly determines whether there is a data chunk signature match and reports the Bloom filter match/miss result 40 to the host 12.

Figure 7:
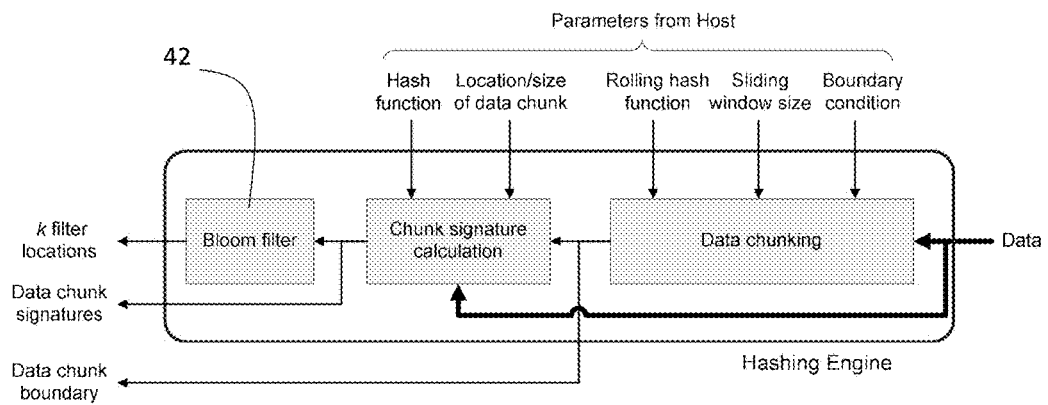
FIG. 7 illustrates the diagram of using the hashing engine to carry out data chunking, chunk signatures, and Bloom filter location parameter calculation concurrently according to embodiments.
Figure 8:
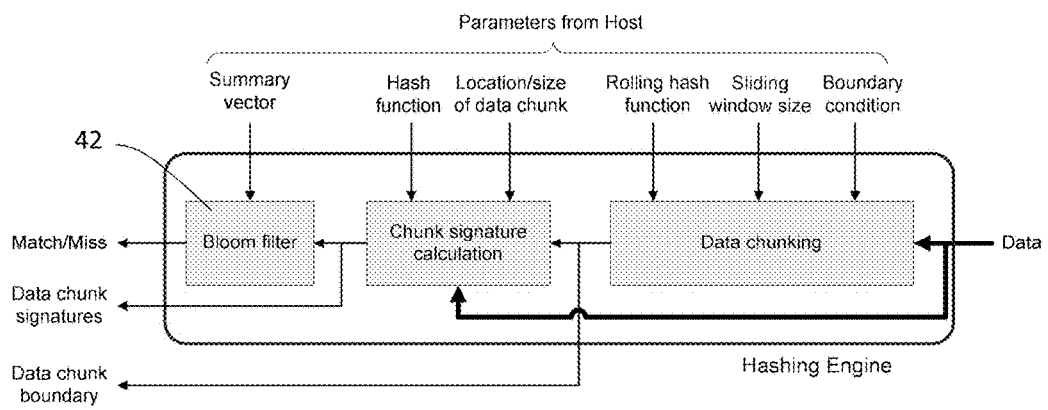
FIG. 8 illustrates the diagram of using the hashing engine to carry out data chunking, chunk signatures, and Bloom filter hit/miss calculation concurrently according to embodiments.

In addition, as shown in FIG. 7 and FIG. 8, all the above processes can be carried out by the hashing engine 18 concurrently, which can most effectively facilitate the realization of data deduplication. In particular, FIG. 7 presents an embodiment in which a Bloom filter 42 is incorporated for the case where the hashing engine 18 is not aware of the current value of the summary vector (FIG. 5) and FIG. 8 presents an embodiment in which the Bloom filter 42 is incorporated for the case where the hashing engine 18 is aware of the current value of the summary vector 36 (FIG. 6).

Figure 9:
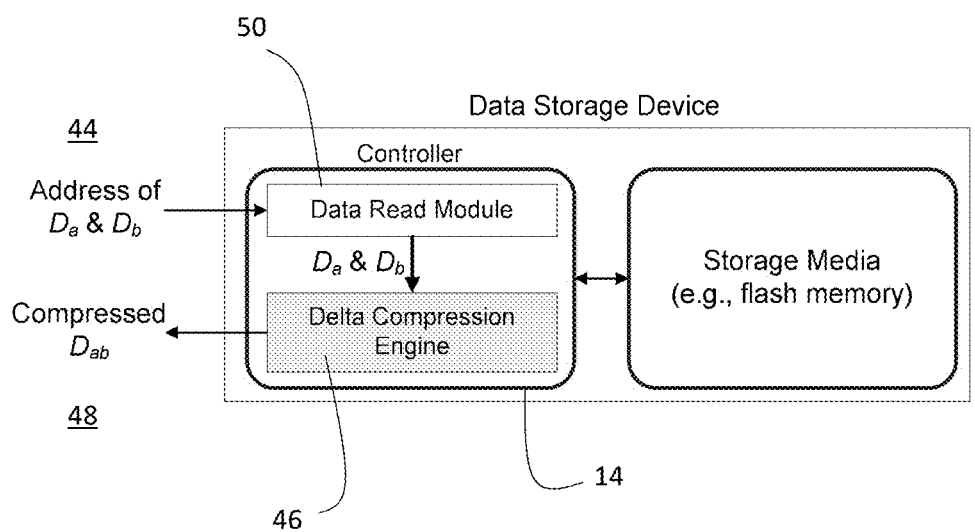
FIG. 9 illustrates the diagram of adding one delta-compression engine in storage device controller for similarity-based data deduplication according to embodiments.

In a further embodiment, delta compression may be implemented in-memory for data chunks identified as similar. In the context of similarity-based data deduplication, once significant similarity has been detected between the current data chunk and an existing data chunk, the system only stores the difference between them in order to reduce the data volume. The difference between similar data chunks is typically compressed by delta compression, i.e., let $D_a$ and $D_b$ represent the two data chunks with significant similarity, the process first obtains their bit-wise XOR $D_{ab}=D_a \oplus D_b$, and then compress the difference $D_{ab}$ using algorithms such as run-length encoding, which is typically referred to as delta compression. As shown in FIG. 9, the storage device controller 14 can also integrate a delta compression engine 46 to facilitate similarity-based data deduplication. Given the address 44 of the two similar data chunks inputted via a data read module 50, the storage device controller 14 uses the integrated delta compression engine 46 to generate the compressed difference 48 for the host 12.

The embodiments of the present disclosure are applicable to various types of storage devices without departing from the spirit and scope of the present disclosure. It is also contemplated that the term host may refer to various devices capable of sending read/write commands to the storage devices. It is understood that such devices may be referred to as processors, hosts, initiators, requesters or the like, without departing from the spirit and scope of the present disclosure.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by processing logic implemented in hardware and/or computer readable program instructions.

Computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The invention claimed is:

1. A data storage infrastructure, comprising:
a host configured to perform data deduplication look-ups; and
a storage media that includes a controller that operates independently of the host, wherein the controller includes a hashing engine for calculating data chunk signatures for data stored in the storage medium, wherein the hashing engine:
inputs a location and size of a data chunk and a summary vector from the host;
implements a hash function on the data chunk that calculates a data chunk signature;
applies a Bloom filter to the data chunk signature to generate a set of filter locations and checks the summary vector provided by the host with the set of filter locations to determine a match/miss result; and
outputs the chunk signature and the match/miss result;
wherein the host receives data chunk signatures and match/miss results and performs data deduplication.

2. The data storage infrastructure of claim 1, wherein the hashing engine further inputs a parameter that specifies the hash function to be used by the hashing engine to calculate the chunk signature.

3. The data storage infrastructure of claim 1, wherein the storage media comprises flash memory.

* * * * *